2,718,090
TRAP-LIKE FISHING DEVICE
Marion F. Messer, Argillite, Ky.

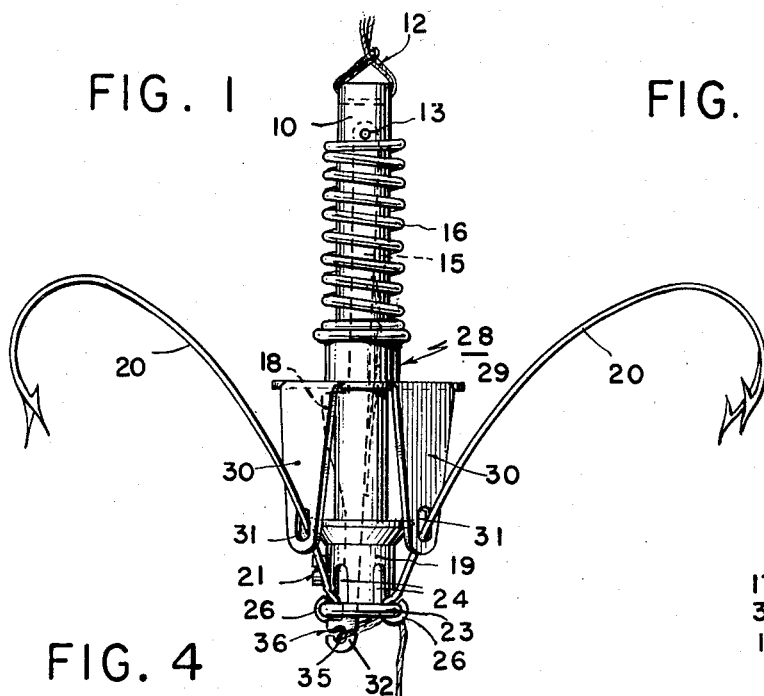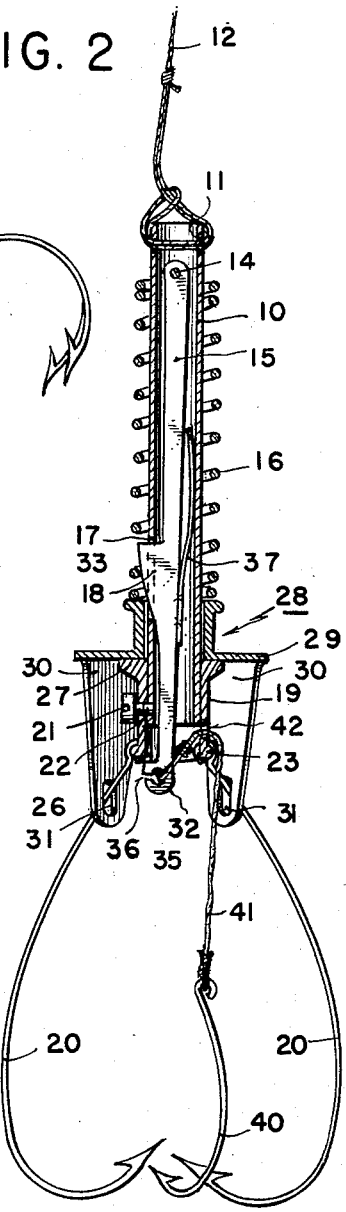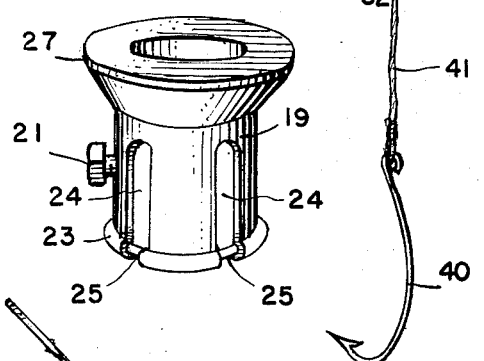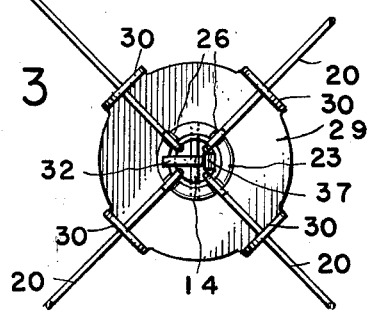

Application May 3, 1955, Serial No. 505,629

1 Claim. (Cl. 43—89)

This invention relates generally to traps and more particularly to automatic fishing devices of the type in which an annular series of pivotally mounted spring actuated hooks are caused to swing inwardly and grab a fish when it pulls or nibbles on bait hung at the center of the device.

One object is to provide a device of this character in which the plurality of grappling hooks may be swung up beyond the transverse plane of their pivotal mountings when the trap is in its set position and which will be instantly swung downwardly to grab the fish when the trap is sprung.

Another object is to provide a device of this character which is extremely sensitive in operation yet not likely to be sprung by the relative movement of the bait and the water in which the device is used.

Another object is to provide a device of this character in which the parts may be conveniently and safely moved to set the trap for use.

Another object is to improve and simplify the construction of trap-like fishing devices of this character so as to reduce the cost of making and assembling the parts, and at the same time provide a device which is strong, durable and effective in operation.

With the above and other objects and advantages in view, the invention resides in the novel combinations and arrangements of parts and the novel features of construction hereinafter described and claimed, and illustrated in the accompanying drawings which show the present preferred embodiments of the invention.

In the drawings:

Fig. 1 is a side elevation of the device in its open or set position;

Fig. 2 is a central longitudinal section showing the trap in its closed or sprung position;

Fig. 3 is a view looking toward the lower end of the device in its open position, some of the grappling hooks being broken away;

Fig. 4 is a detail perspective view of the grappling hook carrying head.

The device is composed of a relatively few parts which may be made at small cost and are easily assembled. The body of the device is a straight cylindrical metal tube 10 having near its upper end a transverse opening 11 to receive a fishing line or other suspending line 12. Another transverse opening 13, preferably at right angles to the first opening, is formed near the top of the tube to receive a removable cross pin 14 with projecting ends. This pin serves both as a pivot for a latch lever 15 disposed longitudinally in the tube and as an abutment for a coil spring 16 disposed on the outside of the body tube. In an intermediate portion of the wall of the tube is formed a longitudinally extending slot 17 to receive a lateral projection 18 on the latch lever; and telescoped over the lower end of the body tube is a removable cylindrical head 19 which carries an annular series of grappling hooks 20.

The hook carrying head 19 is removably secured by a headed screw 21 threaded through an intermediate portion of the wall of the head so that its end may enter a depression or hole 22 in the tube 10. At the lower end of the sleeve or head 19 is a surrounding outwardly projecting bead-like flange 23 and immediately above the latter is an annular series of slots 24 so that reduced portions of the bead at the lower ends of the slots 24 may serve as pivots 25 for the hooks 20. The latter may be ordinary large size fish hooks with open eyes 26 which may be passed through the slots, engaged with the pivot portions 25 and then bent to partially close them so that the hooks will be retained on the head but have free swinging movement. At the upper end of the head 19 is an annular outwardly projecting flange 27 to serve as a stop for a slidable hook actuating member 28 which is moved by the spring 16 and coacts with the latch lever.

The member 28 comprises a cylindrical sleeve portion to slide freely on the body tube 10, a circular outwardly projecting portion or flange 29 at the lower end of the sleeve portion and an annular series of longitudinally projecting arms 30 equally spaced around the edge of the portion 29. The lower end of the spring 16 thrusts against a slight enlargement at the upper end of the member 28 to normally force the portion 29 against the flange 27 of the fixed head 19. The four arms 30 are downwardly tapered and have in their lower portions longitudinal slots 31 through which the hooks have free movement.

The latch lever 15 may be stamped from a metal plate and has at its upper end a transverse opening to freely receive the pivot pin 14. It is of a length to extend slightly below the lower end of the head 19. On that end is an enlargement or head 32 which projects laterally from one edge of the lever, which edge is straight as seen in Fig. 2. Both of the enlargements 18 and 32 project in the same direction or away from the straight edge of the lever. The enlargement 18 has at its top a flat transversely extending shoulder 33 and its edge is inclined inwardly and downwardly from the shoulder to serve as a cam. Formed in the head 32 is a transverse opening 35 with a restricted entrance slot 36 opening away from the straight edge of the lever 15. On the intermediate portion of that edge is soldered or otherwise fastened one end of a longitudinally extending leaf spring 37, the other end of which thrusts against the interior wall of the body tube to swing the latch lever in one direction.

The trap may be baited by applying any suitable bait to an ordinary fish hook 40 of small size fastened to one end of a short piece of fishing line 41. The other end passes through the latch opening 35 and is suitably anchored to the side of the head 19 opposite the flat edge of the latch lever. A transverse hole 42 may be formed in the head 19 and the line may be folded upon itself to form a loop 43 which may be passed through the hole 42 and engaged with the head by passing the loop through the entrance slot 36 into the hole 35. The hole or opening 42 is between two of the slots 24 and on the side of the head 19 adjacent the flat edge of the latch lever. It will be apparent that when the free end of the cord or line 41 is pulled the latch lever will be swung laterally against the tension of the spring 37.

The user may set the trap by moving the member 28 with his fingers against the tension of the spring 16 while the upper end of the body tube is held against the thumb or a stationary object. As that member moves away from the pivotal mountings of the hooks 20 the slotted arms 30 will cause the latter to swing outwardly away from each other, and the lower end of the slot 17 acting on the cam edge of the projection 18 will cause the latch lever to be retracted until the circular flange 29 passes above the latch shoulder 33, whereupon the spring 37 will project the latch and hold the hook actuating member in its elevated position shown in Fig. 1. When a downward pull is exerted on the bait, the cord 41 will swing the latch lever on its pivot until the shoulder disengages the flange 29, whereupon the spring 16 will project the member 28 downwardly to the position shown in Fig. 2, causing the hooks 20 to be swung into engagement with a fish pulling on the bait.

The construction and arrangement of the parts are such that a pull on the bait line 41 in a downward or in any lateral direction will cause the latch lever to be moved laterally to release the spring actuated hook moving member 28, but there is not likelihood that the movement of the device through the water or the movement of the water relative to the bait, will cause the trap to be sprung. It will also be noted that the trap may be easily set without danger to the user, and that when set the hooks 20 will be far away from the bait hook 40.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

A device of the character set forth comprising a cylindrical tube having a longitudinal slot in one side, a transverse pin extending through the upper end of the tube and having projecting ends, a cylindrical head telescoped on the lower end of the tube and removably secured thereto, said head having adjacent its lower end a transverse opening, a plurality of hooks pivotally connected to the lower end of said head and equally spaced therearound, a hook-actuating member comprising a cylindrical sleeve, a circular flange at the lower end of the sleeve and a plurality of equally spaced arms extending downwardly from the flange and having longitudinal slots to freely receive said hooks, said sleeve being freely slidable on said tube above said head and past said slot, a coil spring surrounding said tube and thrusting at one end against the projecting ends of said pin and at its other end against the upper end of said sleeve to normally hold said member against the upper end of said head, a latch lever extending longitudinally in said tube and having its upper end pivotally mounted on said pin and its lower end disposed at the lower end of said head and opposite said transverse opening, said lever having between its ends a laterally projecting enlargement to move in said slot and provided with a transverse shoulder to engage the lower end of said sleeve, a spring disposed in said tube to swing said lever on its pivot pin and project said enlargement outwardly in said slot, and a bait supporting flexible element attached to the lower end of said lever and passed through said transverse opening.

References Cited in the file of this patent

UNITED STATES PATENTS

| | | |
|---|---|---|
| 1,817,185 | Goodrum | Aug. 4, 1931 |
| 2,474,383 | Shur | June 28, 1949 |

FOREIGN PATENTS

| | | |
|---|---|---|
| 660,725 | Great Britain | Nov. 14, 1951 |